(12) United States Patent
Jia et al.

(10) Patent No.: US 11,488,575 B2
(45) Date of Patent: Nov. 1, 2022

(54) SYNTHESIS OF SPEECH FROM TEXT IN A VOICE OF A TARGET SPEAKER USING NEURAL NETWORKS

(71) Applicant: Google LLC, Mountain View, CA (US)

(72) Inventors: Ye Jia, Santa Clara, CA (US); Zhifeng Chen, Sunnyvale, CA (US); Yonghui Wu, Fremont, CA (US); Jonathan Shen, Mountain View, CA (US); Ruoming Pang, New York, NY (US); Ron J. Weiss, New York, NY (US); Ignacio Lopez Moreno, Brooklyn, NY (US); Fei Ren, Mountain View, CA (US); Yu Zhang, Mountain View, CA (US); Quan Wang, Hoboken, NJ (US); Patrick Nguyen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 17/055,951

(22) PCT Filed: May 17, 2019

(86) PCT No.: PCT/US2019/032815
§ 371 (c)(1),
(2) Date: Nov. 16, 2020

(87) PCT Pub. No.: WO2019/222591
PCT Pub. Date: Nov. 21, 2019

(65) Prior Publication Data
US 2021/0217404 A1 Jul. 15, 2021

Related U.S. Application Data

(60) Provisional application No. 62/672,835, filed on May 17, 2018.

(51) Int. Cl.
*G10L 13/04* (2013.01)
*G10L 17/04* (2013.01)
(Continued)

(52) U.S. Cl.
CPC .............. *G10L 13/04* (2013.01); *G10L 17/04* (2013.01); *G10L 19/00* (2013.01); *G06N 3/08* (2013.01); *G10L 2013/021* (2013.01)

(58) Field of Classification Search
CPC ......... G10L 13/04; G10L 17/04; G10L 19/00; G10L 2013/021; G06N 3/08
(Continued)

(56) References Cited

U.S. PATENT DOCUMENTS

| 2003/0093278 A1* | 5/2003 | Malah | G10L 21/038 704/265 |
| 2009/0319274 A1* | 12/2009 | Gross | G10L 17/00 704/260 |

(Continued)

FOREIGN PATENT DOCUMENTS

| JP | 2017-32839 A | 2/2017 |
| JP | 2017-76117 A | 4/2017 |

OTHER PUBLICATIONS

Published as a conference paper at ICLR 2018 Voiceloop: Voice Fitting and Synthesis Via a Phonological Loop Yaniv Taigman, Lior Wolf, Adam Polyak and Eliya Nachmani (Year: 2018) (Year: 2018).*

(Continued)

*Primary Examiner* — Bharatkumar S Shah
(74) *Attorney, Agent, or Firm* — Honigman LLP; Brett A. Krueger

(57) ABSTRACT

Methods, systems, and apparatus, including computer programs encoded on a computer storage medium, for speech synthesis. The methods, systems, and apparatus include
(Continued)

actions of obtaining an audio representation of speech of a target speaker, obtaining input text for which speech is to be synthesized in a voice of the target speaker, generating a speaker vector by providing the audio representation to a speaker encoder engine that is trained to distinguish speakers from one another, generating an audio representation of the input text spoken in the voice of the target speaker by providing the input text and the speaker vector to a spectrogram generation engine that is trained using voices of reference speakers to generate audio representations, and providing the audio representation of the input text spoken in the voice of the target speaker for output.

12 Claims, 5 Drawing Sheets

(51) Int. Cl.
*G10L 19/00* (2013.01)
*G06N 3/08* (2006.01)
*G10L 13/02* (2013.01)

(58) Field of Classification Search
USPC .......................................................... 704/259
See application file for complete search history.

(56) References Cited

U.S. PATENT DOCUMENTS

2018/0374486 A1* 12/2018 Zhao ........................ G10L 17/22
2019/0180732 A1* 6/2019 Ping ......................... G10L 13/00

OTHER PUBLICATIONS

"Transfer Learning from Speaker Verification to Multispeaker Text-to-Speech Synthesis" Ye Jia et al, Jan. 2, 2019.
"Neural Voice Clonning with a few Samples" Sercan O Arik, Mar. 20, 2018.
"Deep Voice 3: 2000—Speaker Neural Text-To-Speech", Nov. 30, 2017.
"What Does the Speaker Embedding Encode" Shuai Wang, Aug. 20, 2017.
International Search Report and Written Opinion for the PCT Application No. PCT/IS2019/032815 dated Jul. 30, 2019.
Japanese Patent Office, Office Action relating to application No. 2020-564447, dated Feb. 28, 2022, received on Mar. 28, 2022.
"Deep neural networks for small footprint text-dependent speaker verification", Ehsan Variani et al., IEEE, May 2014, pp. 4052-4056.
"Speaker Diarization with LSTM", Quan Wang et al., ICASSP 2018, IEEE, Apr. 2018, pp. 5239-5243.
"Deep Voice 3: Scaling Text-to-Speech with Convolutional Sequence Learning", Wei Ping et al., ICLR 2018, Feb. 2018, pp. 1-16.

* cited by examiner

SYNTHESIS OF SPEECH FROM TEXT IN A VOICE OF A TARGET SPEAKER USING NEURAL NETWORKS

TECHNICAL FIELD

This specification generally relates to synthesis of speech from text.

BACKGROUND

Neural networks are machine learning models that employ multiple layers of operations to predict one or more outputs from one or more inputs. Neural networks typically include one or more hidden layers situated between an input layer and an output layer. The output of each hidden layer is used as input to a next layer, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

Each layer generates one or more outputs using the current values of a set of parameters for the layer. Training a neural network involves continually performing a forward pass on the input, computing gradient values, and updating the current values of the set of parameters for each layer. Once a neural network is trained, the final set of parameters can be used to make predictions in a production system.

SUMMARY

A neural network-based system for speech synthesis may generate speech audio in the voice of many different speakers, including speakers unseen during training. The system can use a few seconds of untranscribed reference audio from a target speaker to synthesize new speech in the target speaker's voice, without updating any parameters of the system. The system may use a sequence-to-sequence model, which generates a magnitude spectrogram from a sequence of phonemes or a sequence of graphemes, to condition output on a speaker embedding. The embedding may be computed using an independently-trained speaker encoder network (also referred to herein as a speaker verification neural network, or as a speaker encoder) which encodes an arbitrary length speech spectrogram into a fixed dimensional embedding vector. An embedding vector is a set of values that encodes or otherwise represents data. For example, an embedding vector may be generated by a hidden layer or an output layer of a neural network, in which case the embedding vector encodes one or more data values that are input to the neural network. The speaker encoder may be trained on a speaker verification task using a separate dataset of noisy speech from thousands of different speakers. The system may be able to leverage the knowledge of speaker variability learned by the speaker encoder in order to generalize well and synthesize natural speech from speakers that were never seen during training, using only a few seconds of audio from each one.

In more detail, the system may include an independently trained speaker encoder configured for speaker verification tasks. The speaker encoder may be discriminatively trained. The speaker encoder may be trained on a large dataset of untranscribed audio from thousands of different speakers, using generalized end-to-end loss. The system may decouple networks to enable the networks to be trained on independent datasets, which may alleviate some difficulties in obtaining high quality training data for each purpose. That is, speaker modeling and speech synthesis can be decoupled by independently training a speaker-discriminative embedding network (i.e., the speaker verification neural network) that captures the space of speaker characteristics and training a high quality text to speech model (referred to herein as a spectrogram generation neural network) on a smaller dataset conditioned on the representation learned by the speaker verification neural network. For example, speech synthesis may have different and more onerous data requirements than that of text-independent speaker verification, and may require tens of hours of clean speech with associated transcripts. In contrast, speaker verification may make good use of untranscribed and noisy speech containing reverberation and background noise, but may require a sufficiently large number of speakers. Accordingly, obtaining a single set of high quality training data suitable for both purposes may be significantly more difficult than obtaining two different training data sets that are high quality for respective purposes.

The subject matter of this specification can be implemented so as to realize one or more of the following advantages. For example, the system may result in improved adaptation quality, and enable synthesis of completely novel speakers, different from those used in training, by sampling randomly from the embedding prior (points on a unit hypersphere). In another example, the system may be able to synthesize speech of a target speaker for which only a short limited amount of sample speech is available, e.g., five seconds of speech. Yet another advantage may be that the system may be able to synthesize speech in a voice of a target speaker for which a transcription of a sample of speech of the target speaker is not available. For example, the system may be able to receive a five second sample of speech from "John Doe" for which no samples of speech were previously available and even without a transcription of that sample of speech, generate speech in a voice of "John Doe" for any arbitrary text.

Still another advantage may be that the system may be able to generate speech in a different language from the language in which sample speech is available for a particular speaker. For example, the system may be able to receive a five second sample of speech from "John Doe" in Spanish, and without any other samples of speech from "John Doe," generate speech in a voice of "John Doe" in English.

Unlike conventional systems, by decoupling the training of speaker modeling and speech synthesis, the described system can effectively condition speech on different speakers even when a single set of high quality speech data with speech from a large number of speakers is not available.

While conventional systems may require hours of training and/or fine-tuning before being able to generate speech audio in a new target speaker's voice, the described system can generate speech audio in a new target speaker's voice without requiring additional training or fine-tuning. Therefore, the described system can more quickly perform tasks that require speech to be generated in a new speaker's voice with minimal latency, such as speech-to-speech translation where the generated speech audio is in an original speaker's voice, when compared to conventional systems.

The details of one or more embodiments of the subject matter of this specification are set forth in the accompanying drawings and the description below. Other features, aspects, and advantages of the subject matter will become apparent from the description, the drawings, and the claims.

In some aspects, the subject matter described in this specification may be embodied in methods that may include the actions of obtaining an audio representation of speech of a target speaker, obtaining input text for which speech is to be synthesized in a voice of the target speaker, generating a speaker vector by providing the audio representation to a speaker encoder engine that is trained to distinguish speakers from one another, generating an audio representation of the input text spoken in the voice of the target speaker by providing the input text and the speaker vector to a spectrogram generation engine that is trained using voices of reference speakers to generate audio representations, and providing the audio representation of the input text spoken in the voice of the target speaker for output.

The speaker verification neural network may be trained to generate speaker embedding vectors of audio representations of speech from the same speaker that are close together in an embedding space while generating speaker embedding vectors of audio representations of speech from different speakers that are distant from each other. Alternatively or in addition, the speaker verification neural network may be trained separately from the spectrogram generation neural network. The speaker verification neural network is a long short-term memory (LSTM) neural network.

Generating the speaker embedding vector may comprise: providing a plurality of overlapping sliding windows of the audio representation to the speaker verification neural network to generate a plurality of individual vector embeddings; and generating the speaker embedding vector by computing an average of the individual vector embeddings.

Providing the audio representation of the input text spoken in the voice of the target speaker for output may comprise: providing the audio representation of the input text spoken in the voice of the target speaker to a vocoder to generate a time domain representation of the input text spoken in the voice of the target speaker; and providing the time domain representation for playback to a user. The vocoder may be a vocoder neural network.

The spectrogram generation neural network may be a sequence-to-sequence attention neural network that is trained to predict mel spectrograms from a sequence of phoneme or grapheme inputs. The spectrogram generation neural network may optionally include an encoder neural network, an attention layer, and a decoder neural network. The spectrogram generation neural network may concatenate the speaker embedding vector with outputs of the encoder neural network that are provided as input to the attention layer.

The speaker embedding vector may be different from any speaker embedding vectors used during the training of the speaker verification neural network or the spectrogram generation neural network. During the training of the spectrogram generation neural network, parameters of the speaker verification neural network may be fixed.

A further aspect provides a computer-implemented method of training neural networks for use in speech synthesis, the method comprising: training a speaker verification neural network to distinguish speakers from one another; and training a spectrogram generation neural network, using voices of a plurality of reference speakers, to generate an audio representation of input text. This aspect may comprise any of the features of the preceding aspect.

Other versions include corresponding systems, apparatus, and computer programs, configured to perform the actions of the methods, encoded on computer storage devices.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
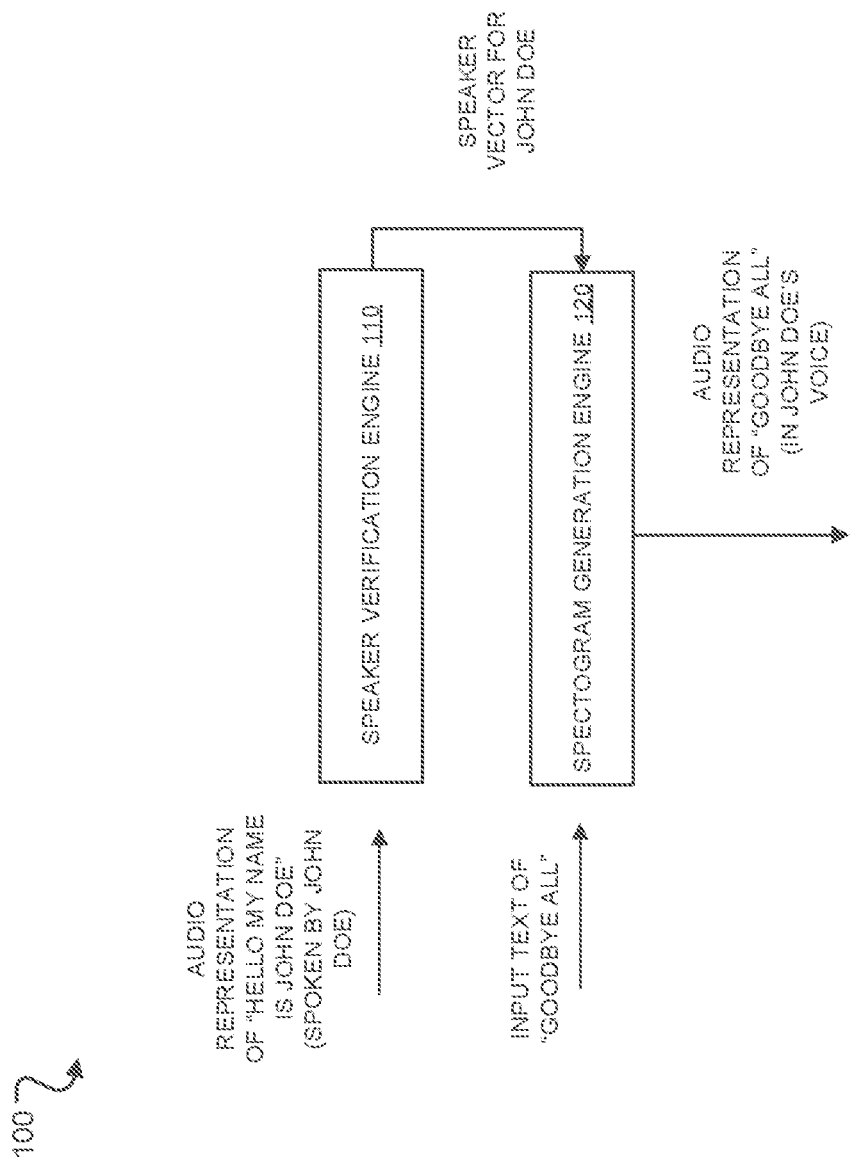
FIG. 1 is a block diagram of an example system that can synthesize speech in a voice of a target speaker.

FIG. 1 is a block diagram that depicts an example speech synthesis system 100 that can synthesize speech in a voice of a target speaker. The speech synthesis system 100 can be implemented as a computer program on one or more computers in one or more locations. The speech synthesis system 100 receives input text together with an audio representation of a target speaker, and processes the input through a series of neural networks to generate speech corresponding to the input text in a voice of the target speaker. For example, if the speech synthesis system 100 receives as input the text of a page of a book with five seconds of audio of John Doe saying "Hi my name is John Doe and I'm providing this sample of speech for testing purposes" it can process these inputs to generate a verbal narration of the page in a voice of John Doe. In another example, if the speech synthesis system 100 receives as input the text of a page of a book with six seconds of audio of Jane Doe narrating from another book, it can process these inputs to generate a verbal narration of the page in a voice of Jane Doe.

As shown in FIG. 1, the system 100 includes a speaker encoder engine 110 and a spectrogram generation engine 120. The speaker encoder engine 110 receives an audio representation of a target speaker speaking and outputs a speaker vector, also called a speaker embedding vector or embedding vector, for the target speaker. For example, the speaker encoder engine 110 receives an audio recording of John Doe saying "Hello my name is John Doe" and, in response, outputs a vector with values that identify John Doe. The speaker vector may also capture the characteristic speaking rate of the speaker.

A speaker vector may be a fixed dimensional embedding vector. For example, speaker vectors that are output by the speaker encoder engine 110 may have a sequence of two hundred fifty six values. The speaker encoder engine 110 may be a neural network that is trained to encode an arbitrary length speech spectrogram into a fixed dimensional embedding vector. For example, the speaker encoder engine 110 may include a long short-term memory (LSTM) neural network that is trained to encode a mel spectrogram, or log-mel spectrogram, representation of speech from a user into a vector with a fixed number of elements (e.g., two hundred fifty six elements). Although mel spectrograms are referred to throughout the present disclosure for the sake of consistency and specificity, it will be appreciated that other types of spectrogram, or any other suitable audio representation, may be used.

The speaker encoder engine 110 may be trained with labeled training data that includes pairs of audio of speech and labels that identify the speaker for the audio such that the engine 110 learns to classify audio as corresponding to different speakers. The speaker vector may be an output of a hidden layer of a LSTM neural network where audio from speakers with voices that are more similar result in speaker vectors that are more similar to one another and audio from speakers with voices that are more different results in speaker vectors that are more different from one another.

The spectrogram generation engine 120 may receive input text to synthesize and receive the speaker vector determined by the speaker encoder engine 110 and, in response, generate an audio representation of speech of that input text in a voice of a target speaker. For example, the spectrogram generation engine 120 may receive input text of "Goodbye all" and the speaker vector determined by the speaker encoder engine 110 from a mel spectrogram representation of John Doe saying "Hello my name is John Doe" and, in response, generate a mel spectrogram representation of speech of "Goodbye all" in John Doe's voice.

The spectrogram generation engine 120 may include a neural network that is a sequence-to-sequence with attention network (also called a sequence-to-sequence synthesizer, sequence-to-sequence synthesis network, or spectrogram generation neural network) that is trained to predict mel spectrograms in a voice of a target speaker from input text and a speaker vector for the target speaker. The neural network may be trained with training data that include triplets that each include text, an audio representation of speech of the text by a particular speaker, and a speaker vector for the particular speaker. The speaker vector used in the training data may be from the spectrogram generation engine 120 and may not need to be from the audio representation of speech of the text for that triplet. For example, a triplet included in the training data may include input text of "I like computers," a mel spectrogram from audio of John Smith saying "I like computers," and a speaker vector output by the speaker encoder engine 110 from a mel spectrogram from audio of John Smith saying "Hi my name is John Smith."

In some implementations, the training data for the spectrogram generation engine 120 may be generated using the speaker encoder engine 110 after the speaker encoder engine 110 is trained. For example, a set of paired training data may originally include only pairs of input text and mel spectrograms of speech of that text. The mel spectrogram in each pair of the paired training data may be provided to the trained speaker encoder engine 110 which may output a respective speaker vector for each mel spectrogram. The system 100 may then add each speaker vector to the respective pair in the paired training data to generate the training data with triplets of text, an audio representation of speech of the text by a particular speaker, and a speaker vector for the particular speaker.

In some implementations, the audio representation generated by the spectrogram generation engine 120 may be provided to a vocoder to generate audio. For example, a mel spectrogram of John Doe saying "Goodbye all" may be in a frequency domain and provided to another neural network, that is trained to receive frequency domain representations and output time domain representations, and the other neural network may output a time domain waveform of "Goodbye all" in John Doe's voice. The time domain waveform may then be provided to a speaker (e.g., a loudspeaker) that produces sound of "Goodbye all" spoken in John Doe's voice.

In some implementations, the system 100 or another system may be used to perform a process for synthesizing speech in a voice of a target speaker. The process may include actions of obtaining an audio representation of speech of a target speaker, obtaining input text for which speech is to be synthesized in a voice of the target speaker, generating a speaker vector by providing the audio representation to a speaker encoder engine that is trained to distinguish speakers from one another, generating an audio representation of the input text spoken in the voice of the target speaker by providing the input text and the speaker vector to a spectrogram generation engine that is trained using voices of reference speakers to generate audio representations, and providing the audio representation of the input text spoken in the voice of the target speaker for output.

For example, the process may include the speaker encoder engine 110 obtaining a mel spectrogram from audio of Jane Doe saying "I like computers" and generating a speaker vector for Jane Doe that is different than a speaker vector that would be generated for a mel spectrogram of John Doe saying "I like computers." The spectrogram generation engine 120 may receive the speaker vector for Jane Doe and obtain input text of "Hola como estas" which may be Spanish that means "Hello, how are you" in English and, in response, may generate a mel spectrogram that may be then transformed by a vocoder into speech of "Hola como estas" in a voice of Jane Doe.

In a more detailed example, the system 100 may include three independently trained components: an LSTM speaker encoder for speaker verification which outputs a fixed-dimensional vector from an arbitrary length speech signal, a sequence-to-sequence attention network which predicts mel spectrograms from a sequence of grapheme or phoneme inputs, conditioned on the speaker vector, and an autoregressive neural vocoder network which converts the mel spectrogram into a sequence of time domain waveform samples. The LSTM speaker encoder may be the speaker encoder engine 110 and the sequence-to-sequence with attention network may be the spectrogram generation engine 120.

The LSTM speaker encoder is used to condition the synthesis network on a reference speech signal from the desired target speaker. Good generalization can be achieved using a reference speech signal which captures the characteristics of different speakers. Good generalization can lead to the identification of these characteristics using only a short adaptation signal, independent of its phonetic content and background noise. These objectives are satisfied using a speaker-discriminative model trained on a text-independent speaker verification task. The LSTM speaker encoder may be a speaker-discriminative audio embedding network, which is not limited to a closed set of speakers.

The LSTM speaker encoder maps a sequence of mel spectrogram frames computed from a speech utterance of arbitrary length, to a fixed-dimensional embedding vector, known as a d-vector or speaker vector. The LSTM speaker encoder may be configured such that given an utterance x, the LSTM network is used to learn a fixed-dimensional vector embedding $e_x$=f(x). A generalized end-to-end loss may be used to train the LSTM network, such that d-vectors of utterances from the same speaker are close to each other in the embedding space, e.g., such that d-vectors of the utterances have high cosine similarity, while d-vectors of utterances from different speakers are distant from each other. Accordingly, given an arbitrarily long utterance, the speaker encoder may be run on overlapping sliding windows of a length, e.g., 800 milliseconds, and an average of the L2-normalized window embeddings used as the final embedding of the entire utterance.

The sequence-to-sequence attention neural network may model multiple particular speakers by, for each audio example x in a training dataset, concatenating a d-dimensional embedding vector associated with the true speaker with the output of the encoder neural network at each time step before the output is provide to the attention neural network. Speaker embeddings provided to an input layer of the attention neural network may be enough to converge across different speakers. The synthesizer can be an end-to-end synthesis network that does not rely on intermediate linguistic features.

In some implementations, the sequence-to-sequence attention network may be trained on pairs of text transcript and target audio. At the input, we map the text to a sequence of phonemes which leads to faster convergence and improved pronunciation of rare words such as person or place names. The network is trained in a transfer learning configuration, using a pre-trained speaker encoder (whose parameters are frozen) to extract a speaker embedding from the target audio, i.e. the speaker reference signal is the same as the target speech during training. No explicit speaker identifier labels are used during training.

Additionally or alternatively, a decoder of the network may include both L2 loss on spectrogram feature reconstruction with an additional L1 loss. A combined loss may be more robust on noise training data. Additionally or alternatively, noise reduction by spectral subtraction, e.g., at 10-percentile, may be performed on the targets for the mel spectrogram prediction network to further make the synthesized audio clean.

The system 100 may capture the unique characteristics of a speaker never seen before from a single short audio clip and synthesize new speech with those characteristics. The system 100 may achieve: (1) a high level of naturalness of the synthesized speech; and (2) a high degree of similarity to the target speaker. While a high level of naturalness usually requires a large amount of high quality speech-transcript pairs as training data, achieving a high degree of similarity usually requires a good amount of training data for each speaker. However, recording a large amount of high quality data for each individual speakers is very expensive or even in-feasible in practice. The system 100 may separate the training of a text to speech system with high-naturalness and the training of another speaker-discriminative embedding network that well captures speaker characteristics. In some implementations, the speaker-discriminative model is trained on a text-independent speaker verification task.

The neural vocoder inverts synthesized mel spectrograms emitted by the synthesizer into time-domain waveforms. In some implementations the vocoder can be a sample-by-sample autoregressive WaveNet. The architecture can include multiple dilated convolutional layers. The mel spectrogram predicted by the synthesizer network captures all of the relevant detail needed for high quality synthesis of a variety of voices, allowing a multispeaker vocoder to be constructed by simply training on data from many speakers without needing to explicitly condition on the speaker vector. More detail about the WaveNet architecture is described in van den Oord et. al., WaveNet: A generative model for raw audio. CoRR abs/1609.03499, 2016.

Figure 2:
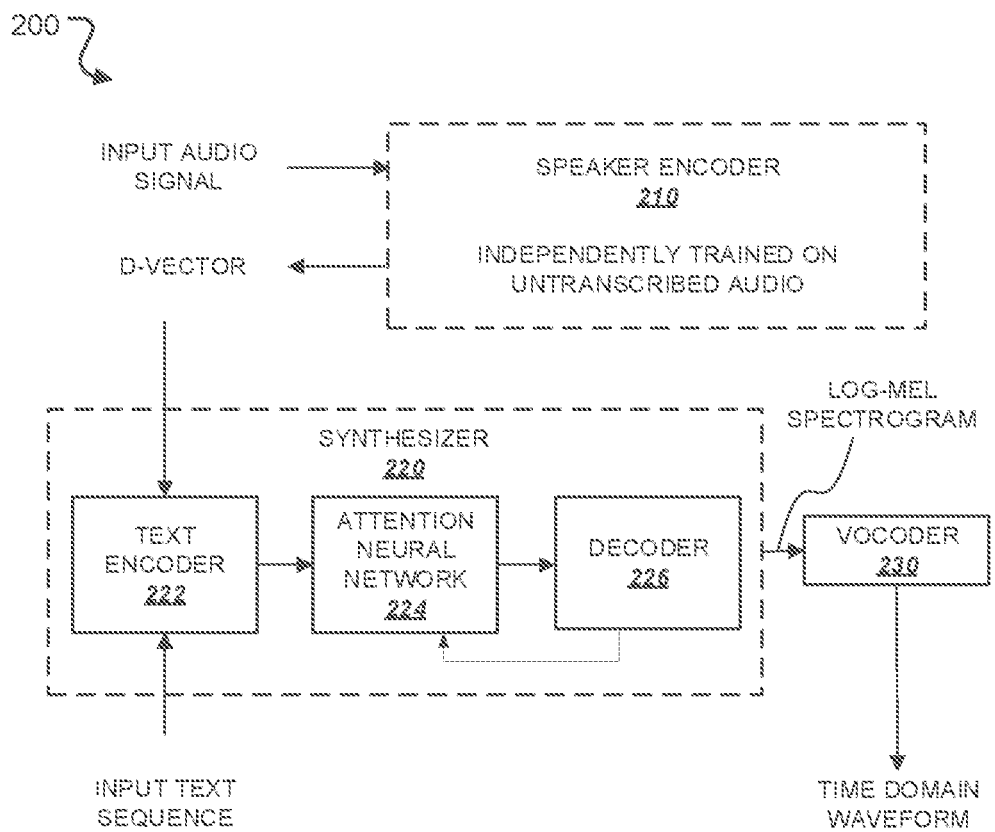
FIG. 2 is a block diagram of an example system during training to synthesize speech.

FIG. 2 is a block diagram of an example system 200 during training to synthesize speech. The example system 200 includes a speaker encoder 210, a synthesizer 220, and a vocoder 230. The synthesizer 220 includes a text encoder 222, an attention neural network 224, and a decoder 226. During training, the separately-trained speaker encoder 210, whose parameters may be frozen, may extract a speaker's fixed-length d-vector from a variable-length input audio signal. During training, the reference signal or target audio may be the ground-truth audio paralleled with the text. The d-vector may be concatenated with the output of the text encoder 222 and passed to the attention neural network 224 at each of multiple time steps. Except for the speaker encoder 210, other parts of the system 200 may be driven by the reconstruction loss from the decoder 226. The synthesizer 220 predicts a mel spectrogram from an input text sequence and can provide the mel spectrogram to the vocoder 230. The vocoder 230 can convert the mel spectrogram into a time domain waveform.

Figure 3:
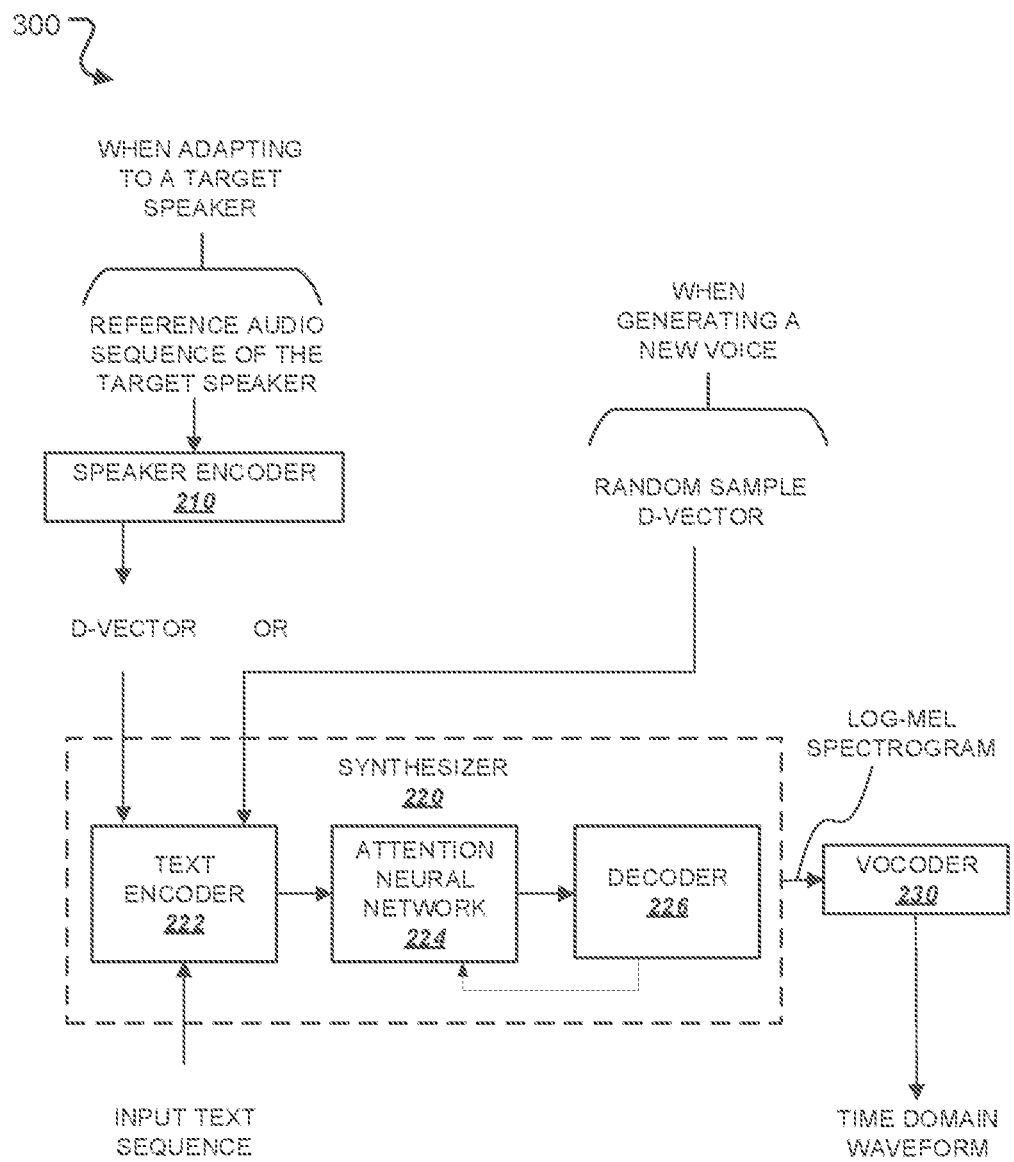
FIG. 3 is a block diagram of an example system during inference to synthesize speech.

FIG. 3 is a block diagram of an example system 300 during inference to synthesize speech. System 300 includes the speaker encoder 210, the synthesizer 220, and the vocoder 230. During inference, one of two approaches may be used. In a first approach, the text encoder 222 may be directly conditioned on a d-vector from unseen and/or untranscribed audio whose transcript does not need to match the text to be synthesized. This may allow for the network to generate an unseen voice from a single audio clip. Since the speaker characteristics to use for synthesis are inferred from audio, it can be conditioned on audio from speakers that are outside the training set. In a second approach, a random sample d-vector may be obtained and the text encoder 222 can be conditioned on the random sample d-vector. As the speaker encoder may be trained from a large amount speakers, the random d-vector may also produce random speakers.

Figure 4:
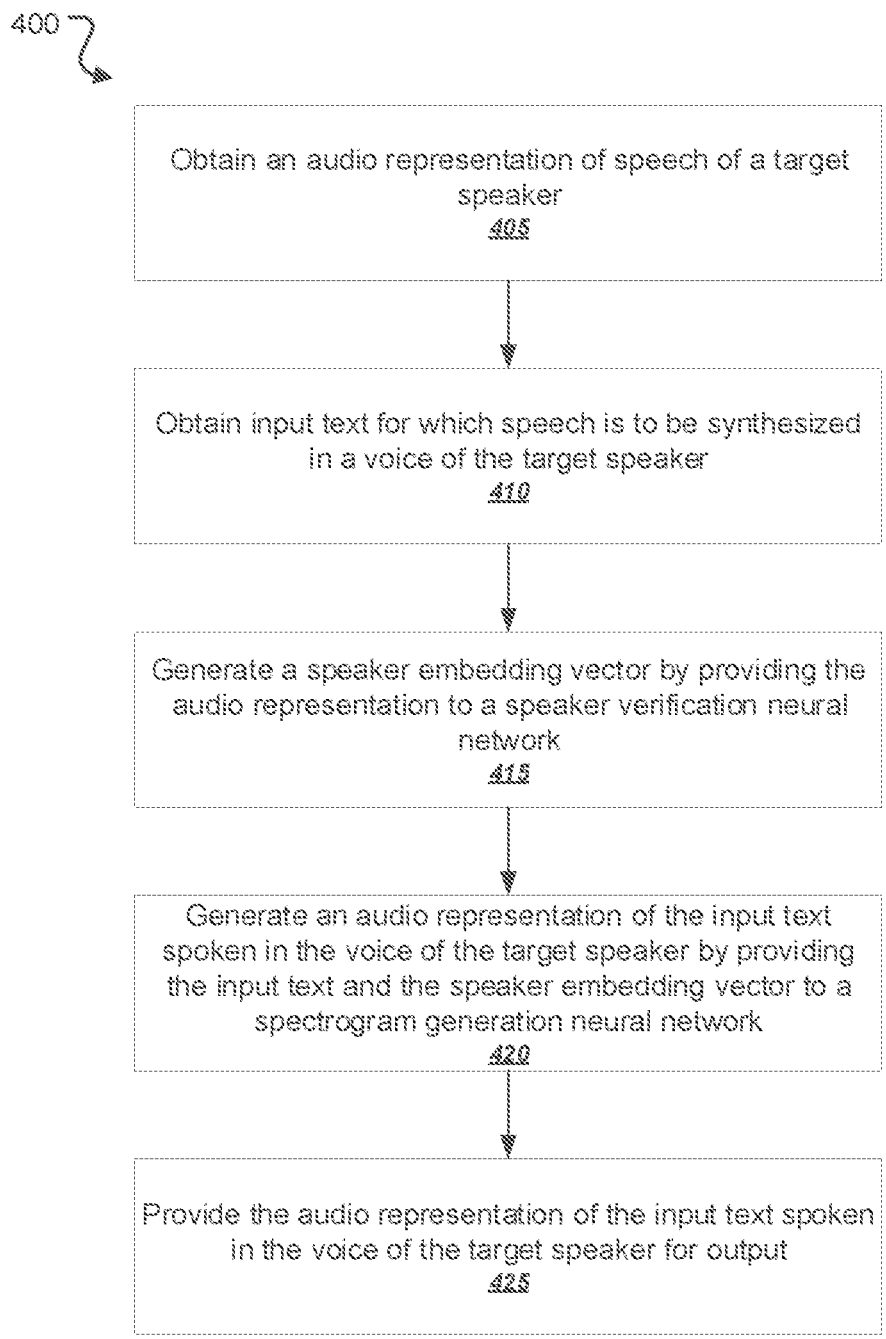
FIG. 4 is a flowchart of an example process for generating an audio representation of text spoken in the voice of a target speaker

FIG. 4 is a flowchart of an example process 400 for generating an audio representation of text spoken in the voice of a target speaker. The example process will be described as being performed by a system programmed appropriately in accordance with this specification.

The system obtains an audio representation of speech of a target speaker (405). For example the audio representation can be in the form of an audio recording file and the audio can be captured by one or more microphones.

The system obtains input text for which speech is to be synthesized in a voice of the target speaker (410). For example the input text can be in the form of a text file.

The system generates a speaker embedding vector by providing the audio representation to a speaker verification neural network that is trained to distinguish speakers from one another (415). For example, the speaker verification neural network can be an LSTM neural network, and the speaker embedding vector can be an output of a hidden layer of the LSTM neural network.

In some implementations, the system provides multiple overlapping sliding windows of the audio representation to the speaker verification neural network to generate a plurality of individual vector embeddings. For example, the audio representation can be broken into windows of approximately 800 ms lengths (e.g., 750 ms or less, 700 ms or less, 650 ms or less), while the overlap can be approximately 50% (e.g., 60% or more, 65% or more, 70% or more). The system can then generate the speaker embedding vector by computing an average of the individual vector embeddings.

In some implementations, the speaker verification neural network is trained to generate speaker embedding vectors, e.g., d-vectors, of audio representations of speech from the same speaker that are close together in an embedding space. The speaker verification neural network can also be trained to generate speaker embedding vectors of audio representations of speech from different speakers that are distant from each other.

The system generates an audio representation of the input text spoken in the voice of the target speaker by providing the input text and the speaker embedding vector to a spectrogram generation neural network that is trained using voices of reference speakers to generate audio representations (420).

In some implementations, during the training of the spectrogram generation neural network, parameters of the speaker embedding neural network are fixed.

In some implementations, the spectrogram generation neural network can be trained separated from the speaker verification neural network.

In some implementations, the speaker embedding vector is different from any speaker embedding vectors used during the training of the speaker verification neural network or the spectrogram generation neural network.

In some implementations, the spectrogram generation neural network is a sequence-to-sequence attention neural network that is trained to predict mel spectrograms from a sequence of phoneme or grapheme inputs. For example, the spectrogram generation neural network architecture can be based on Tacotron 2. More detail about the Tacotron 2 neural network architecture is described in Shen et al., Natural TIS synthesis by conditioning WaveNet on mel spectrogram predictions, published in Proc. IEEE International Conference on Acoustics, Speech, and Signal Processing (ICASSP), 2018.

In some implementations, the spectrogram generation neural network includes spectrogram generation neural network includes an encoder neural network, an attention layer, and a decoder neural network. In some implementations, the spectrogram generation neural network concatenates the speaker embedding vector with outputs of the encoder neural network that are provided as input to the attention layer.

In some implementations, the encoder neural network and sequence-to-sequence attention neural network can be trained on unbalanced and disjoint sets of speakers. The encoder neural network can be trained to discriminate between speakers, which may lead to more reliable transfer of speaker characteristics.

The system provides the audio representation of the input text spoken in the voice of the target speaker for output (425). For example, the system can generate a time domain representation of the input text.

In some implementations, the system provides the audio representation of the input text spoken in the voice of the target speaker to a vocoder to generate a time domain representation of the input text spoken in the voice of the target speaker. The system can provide the time domain representation for playback to a user.

In some implementations, the vocoder is a vocoder neural network. For example, the vocoder neural network can be a sample-by-sample autoregressive WaveNet that can invert synthesized mel spectrograms generated by the synthesis network into time domain waveforms. The vocoder neural network can include multiple dilated convolutional layers.

Figure 5:
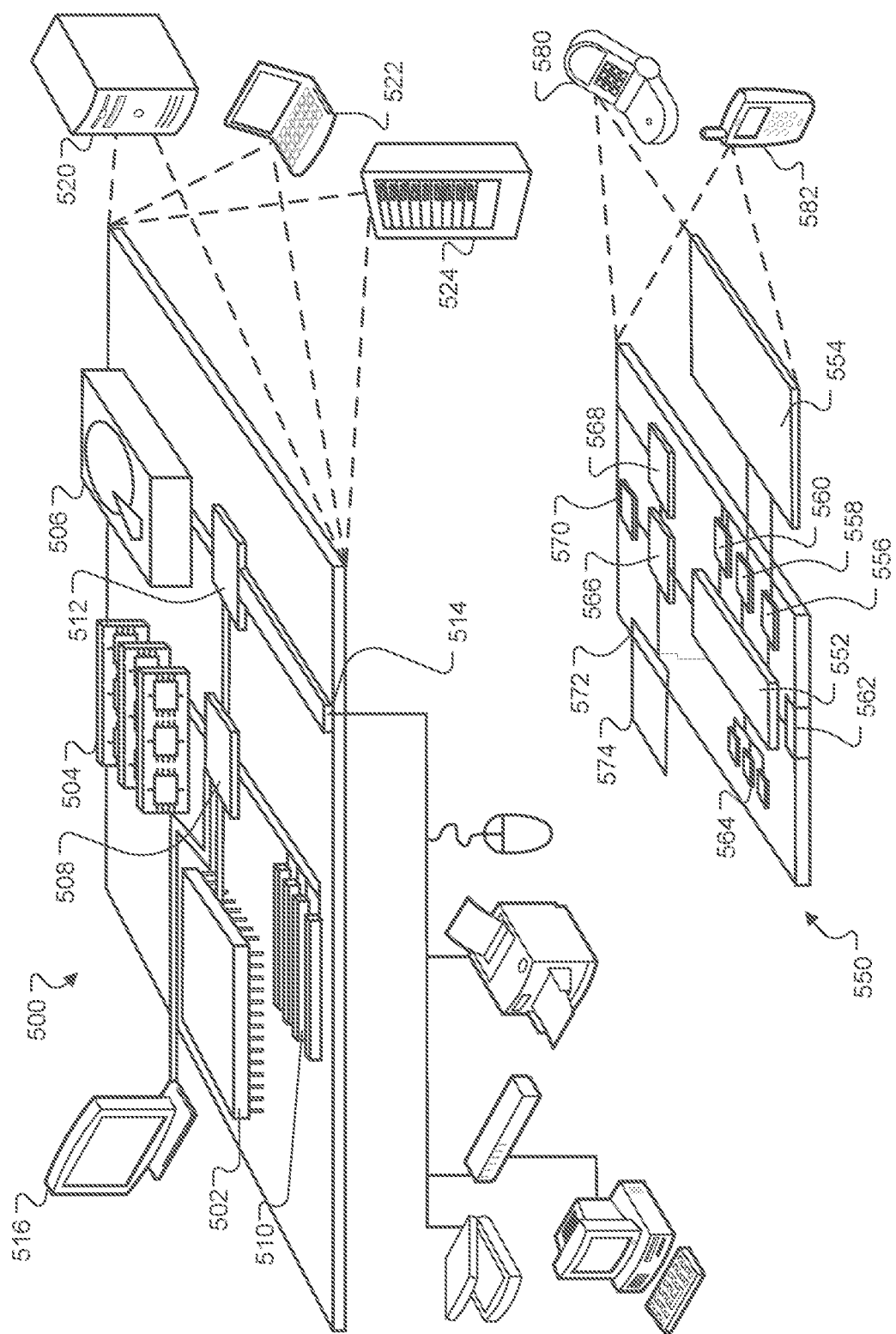
FIG. 5 is a diagram of examples of computing devices.

FIG. 5 shows an example of a computing device 500 and a mobile computing device 450 that can be used to implement the techniques described here. The computing device 500 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 450. Each of such devices may contain one or more of the computing device 500 and the mobile computing device 450, and an entire system may be made up of multiple computing devices communicating with each other.

The mobile computing device 450 includes a processor 552, a memory 564, an input/output device such as a display 554, a communication interface 566, and a transceiver 568, among other components. The mobile computing device 450 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 450, including instructions stored in the memory 564. The processor 552 may be implemented as a chipset of chips that include separate and multiple analog and digital processors. The processor 552 may provide, for example, for coordination of the other components of the mobile computing device 450, such as control of user interfaces, applications run by the mobile computing device 450, and wireless communication by the mobile computing device 450.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 450 with other devices. The external interface 562 may provide, for example, for wired communication in some implementations, or for wireless communication in other implementations, and multiple interfaces may also be used.

The memory 564 stores information within the mobile computing device 450. The memory 564 can be implemented as one or more of a computer-readable medium or media, a volatile memory unit or units, or a non-volatile memory unit or units. An expansion memory 574 may also be provided and connected to the mobile computing device 450 through an expansion interface 572, which may include, for example, a SIMM (Single In Line Memory Module) card interface. The expansion memory 574 may provide extra storage space for the mobile computing device 450, or may also store applications or other information for the mobile computing device 450. Specifically, the expansion memory 574 may include instructions to carry out or supplement the processes described above, and may include secure information also. Thus, for example, the expansion memory 574 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 450 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 450, which may be used as appropriate by applications running on the mobile computing device 450.

The mobile computing device 450 may also communicate audibly using an audio codec 560, which may receive spoken information from a user and convert it to usable digital information. The audio codec 560 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining an audio representation of speech of a target speaker;
   obtaining input text for which speech is to be synthesized in a voice of the target speaker;
   generating a speaker embedding vector by providing the audio representation to a speaker verification neural network that is trained to distinguish speakers from one another;
   generating an audio representation of the input text spoken in the voice of the target speaker by providing the input text and the speaker embedding vector to a spectrogram generation neural network that is trained using voices of reference speakers to generate audio representations; and
   providing the audio representation of the input text spoken in the voice of the target speaker to a vocoder to generate a time domain representation of the input text spoken in the voice of the target speaker; and
   providing the time domain representation for playback to a user.

2. The method of claim 1, wherein the speaker verification neural network is trained to generate speaker embedding vectors of audio representations of speech from the same speaker that are close together in an embedding space while generating speaker embedding vectors of audio representations of speech from different speakers that are distant from each other.

3. The method of claim 1, wherein the speaker verification neural network is trained separately from the spectrogram generation neural network.

4. The method of claim 1, wherein the speaker verification neural network is a long short-term memory (LSTM) neural network.

5. A computer-implemented method comprising:
obtaining an audio representation of speech of a target speaker;
obtaining input text for which speech is to be synthesized in a voice of the target speaker;
generating a speaker embedding vector by:
  providing a plurality of overlapping sliding windows of the audio representation to a speaker verification neural network to generate a plurality of individual vector embeddings, the speaker verification neural network trained to distinguish speakers from one another; and
  generating the speaker embedding vector by computing an average of the individual vector embeddings;
generating an audio representation of the input text spoken in the voice of the target speaker by providing the input text and the speaker embedding vector to a spectrogram generation neural network that is trained using voices of reference speakers to generate audio representations; and
providing the audio representation of the input text spoken in the voice of the target speaker for output.

6. The method of claim 1, wherein the vocoder comprises a vocoder neural network.

7. The method of claim 1, wherein the spectrogram generation neural network is a sequence-to-sequence attention neural network that is trained to predict mel spectrograms from a sequence of phoneme or grapheme inputs.

8. The method of claim 7, wherein the spectrogram generation neural network includes an encoder neural network, an attention layer, and a decoder neural network.

9. The method of claim 8, wherein the spectrogram generation neural network concatenates the speaker embedding vector with outputs of the encoder neural network that are provided as input to the attention layer.

10. The method of claim 1, wherein the speaker embedding vector is different from any speaker embedding vectors used during the training of the speaker verification neural network or the spectrogram generation neural network.

11. The method of claim 1, wherein, during the training of the spectrogram generation neural network, parameters of the speaker verification neural network are fixed.

12. A system comprising one or more computers and one or more storage devices storing instructions that when executed by the one or more computers cause the one or more computers to perform the operations of the method of claim 1.

* * * * *